US012307241B2

(12) United States Patent
Liu et al.

(10) Patent No.: US 12,307,241 B2
(45) Date of Patent: May 20, 2025

(54) OTA DIFFERENTIAL UPGRADE METHOD AND SYSTEM OF MASTER-SLAVE ARCHITECTURE

(71) Applicant: SHANGHAI ABUP TECHNOLOGY CO., LTD, Shanghai (CN)

(72) Inventors: Wei Liu, Shanghai (CN); Rongwei Sun, Shanghai (CN); Xuejing Wan, Zhejiang Province (CN); Xing Zhao, Shanghai (CN); Rui Shen, Shanghai (CN); Pengfei Wang, Shanghai (CN)

(73) Assignee: SHANGHAI ABUP TECHNOLOGY CO., LTD, Shanghai (CN)

( * ) Notice: Subject to any disclaimer, the term of this patent is extended or adjusted under 35 U.S.C. 154(b) by 493 days.

(21) Appl. No.: 17/746,151

(22) Filed: May 17, 2022

(65) Prior Publication Data
US 2022/0374226 A1 Nov. 24, 2022

(30) Foreign Application Priority Data
May 19, 2021 (CN) .......................... 202110548439.8

(51) Int. Cl.
G06F 9/44 (2018.01)
G06F 8/658 (2018.01)
H04L 67/00 (2022.01)

(52) U.S. Cl.
CPC .............. G06F 8/658 (2018.02); H04L 67/34 (2013.01)

(58) Field of Classification Search
CPC ....................................................... G06F 8/658
USPC .......................................................... 717/173
See application file for complete search history.

(56) References Cited

U.S. PATENT DOCUMENTS

2023/0004381 A1* 1/2023 Ma ........................ G06F 8/658

FOREIGN PATENT DOCUMENTS

WO WO-2024000354 A1 * 1/2024

* cited by examiner

Primary Examiner — Evral E Bodden
(74) Attorney, Agent, or Firm — Clement Cheng

(57) ABSTRACT

The invention relates to the field of the Internet of Things, and in particular, to an OTA differential upgrade method and system of a master-slave architecture. The method comprises: Step S1, obtaining an upgrade scheme, and determining a master-slave connection relationship and an upgrade manner according to the upgrade scheme; Step S2, downloading a differential upgrading file; Step S3, determining a processing mode of a master node according to the upgrading manner of a slave node; if the upgrading manner of the slave node is a first manner, the node flashes and restores the differential upgrading file and sends the differential upgrading file to the slave node, so that the slave node completes upgrading; if the upgrading manner of the slave node is a second manner, the master node flashes and restores the differential upgrading file and sends the differential upgrading file to the slave node for upgrading.

16 Claims, 8 Drawing Sheets

OTA DIFFERENTIAL UPGRADE METHOD AND SYSTEM OF MASTER-SLAVE ARCHITECTURE

BACKGROUND OF THE INVENTION

1. Field of the Invention

The invention relates to the field of the Internet of Things (Iot), and more particularly, to an Over-The-Air (OTA) differential upgrade method and system of a master-slave architecture.

2. Description of the Related Art

The Internet of Things is a network-based information carrier, and network comprises Internet, wireless network, traditional telecommunication network and other networks. Intelligent processing of intelligent perception, identification, data collection and device management can be achieved through IoT devices. The IoT devices comprise information sensors, radio frequency identification technology, global positioning system, infrared sensors, laser scanners, in-vehicle devices, smart speakers and other devices. All the necessary information such as sound, light, electricity, heat, images and locations can be collected through the IoT devices, so that intelligent perception, identification and management is achieved. It is impossible for the IoT devices to run without the support of applications, operating systems and firmware, etc. Over time, people have more requirements for programs in the IoT devices. For example, there exit requirements for solving vulnerability and compatibility, increasing interaction modes or providing more functions. Thus, the programs in the IoT devices need to be upgraded.

In the prior art, when upgrading the IoT devices, a master-slave structure relationship is often constructed. Master nodes use standard communication protocols, such as Bluetooth, wireless, 485, Long Range (LoRa) and other protocols to flash the entire package of slave nodes. However, this method has some problems, that is, advantages of the master-slave architecture cannot be fully utilized, the flashing rate is reduced, the upgrading cycle is lengthened, and the upgrade stability cannot be ensured.

SUMMARY OF THE INVENTION

Given that the foregoing problems exist in the prior art, the present invention provides an OTA differential upgrade method and system of a master-slave architecture.

An OTA differential upgrade method of a master-slave architecture, comprising a server and a plurality of nodes to be upgraded, wherein the plurality of nodes to be upgraded comprise a root node;

the OTA differential upgrade method comprises:
Step S1, obtaining, by the root node, a preset upgrade scheme from the server, and determining a master-slave connection relationship between every two of the plurality of nodes to be upgraded and an upgrading manner for each of the plurality of nodes to be upgraded according to the upgrade scheme;
Step S2, downloading, by the root node, a differential upgrading file from the server according to the upgrade scheme;
Step S3, for every two of the plurality of nodes to be upgraded having the master-slave connection relationship, determining a processing mode of a master node according to the upgrading manner of a slave node;
if the upgrading manner of the slave node is a first manner, then turn to Step S4;
if the upgrading manner of the slave node is a second manner, then turn to Step S5;
Step S4, the master node flashes and restores the differential upgrading file and sends the differential upgrading file to the slave node, so that the slave node completes upgrading;
Step S5, the master node directly sends the differential upgrading file to the slave node for upgrading.

Preferably, the upgrade scheme comprises an upgrade sequence and connection conditions;
in Step S1, the root node determines the master-slave relationship between two of the plurality of nodes to be upgraded in this upgrade, according to the upgrade sequence;
in Step S4 or Step S5, for the two of the plurality of nodes to be upgraded having the master-slave connection relationship in this upgrading, the master node determines whether the slave node satisfies the corresponding connection relationship, and if the slave node satisfies the connection conditions, a connection is established between the master node and the slave node.

Preferably, current version data of the slave node is pre-stored in a slave storage area of the slave node;
in Step 4, for every two of the plurality of nodes to be upgraded having the master-slave connection relationship, Step S4 specifically comprises the steps of:
Step S40, obtaining, by the master node, the differential upgrading file and sending an upgrade request to the slave node;
Step S41, upon receiving an approval request from the slave node, controlling the master node and the slave node to enter an upgrading mode at the same time;
Step S42, the master node being connected to the slave node according to the master-slave connection relationship;
Step S43, obtaining, by the master node, current version data of the slave node, and storing the current version data to a main storage area of the master node;
Step S44, analyzing, by the master node, the differential upgrading file, to obtain differential block upgrade data corresponding to a plurality of main differential storage blocks in which the current version data in the main storage area is upgraded and changed;
Step S45, flashing and storing, by the master node, the current version data in all the plurality of main differential storage blocks according to the difference block upgrading data, to obtain flashed and restored upgrading version data;
Step S46, sending, by the maser node, all the differential block upgrade data to a respective slave differential storage block in which the current version data changes in the slave storage area, so that the slave node completes upgrading.

Preferably, Step S46 comprises:
Step S461, sending, by the master node, a flashing request to the slave node;
Step S462, upon receiving a receiving request corresponding to the flashing request from the slave node, sending all the differential block upgrade data to the slave differential storage block in the slave storage area, so that the slave node completes upgrading.

Preferably, Step S44 further comprises:
performing, by the master node, a backup storage of the current version data in the plurality of the main differential storage blocks, to generate a backup version data;
Step S46 is followed by Step S47;
Step S47, determining, by the master node, whether receiving version number of the slave node within a preset time:
if yes, exit the process;
if not, resend the differential block upgrade data to the slave node to determine whether the version number of the slave node is received within the preset time, and when the number of sending times exceeds a preset number of times, send the backup version data to the slave differential storage block of the slave node.

Preferably, the current version data of the slave node is pre-stored in the slave storage area of the slave node;
in step S5, for every two of the plurality of nodes to be upgraded having the master-slave connection relationship, Step S5 specifically comprises the steps of:
Step S50, obtaining, by the slave node, the differential upgrading file directly sent by the master node;
Step S51, the slave node restarting and entering the upgrading mode;
Step S52, obtaining, according to the differential upgrading file, the plurality of slave differential storage blocks in which the current version data changes in the slave storage area, and flashing the current version data in all the plurality of slave differential storage blocks.

Preferably, Step S52 further comprises:
performing a backup of the current version data in the slave differential storage blocks to generate backup version data;
Step S52 is followed by Step S53;
Step S53, after flashing all the slave differential storage blocks, it is determined whether the slave differential storage blocks can be rebooted again;
if yes, exit the process;
if not, flash the slave differential storage blocks according to the backup version data.

Preferably, a process of performing a backup of the current version data in the slave differential storage blocks comprises:
determining whether storage resources of the slave node meet a preset backup threshold:
if yes, store the backup version data in the slave storage area;
if not, store the backup version data in the main storage area of the master node.

Preferably, a verification step is executed before Step S43 or Step S52;
the verification step comprises:
determining whether a file verification value of the differential upgrading file is consistent with a data verification value of the current version data:
if yes, the verification is passed and continue to perform subsequent steps;
if not, the verification is not passed, and exit the process.

Preferably, in Step S1, when the root node analyzes if the node to be upgraded in this upgrading is only the root node;
in Step S2, the root node restarts and enters the upgrading mode, and obtains a plurality of root differential storage blocks where the current version data changes in a root storage area of the root node, and flashes the current version data in all the plurality of root differential storage blocks.

An OTA differential upgrade system of a master-slave architecture, comprising a server and a plurality of nodes to be upgraded, wherein the plurality of nodes to be upgraded comprise a root node;
the OTA differential upgrade system comprises:
an acquisition module for acquiring a preset upgrade scheme from the server, and determining a master-slave connection relationship between two of the plurality of nodes to be upgraded and an upgrading manner for each of the plurality of nodes to be upgraded according to the upgrade scheme;
a download module, connected to the acquisition module, and configured to download a differential upgrading file from the server according to the upgrade scheme;
a selection module, connected to the download module, and configured to determine a processing mode of a master node according to the upgrading manner of a slave node for every two of the plurality of nodes to be upgraded having the master-slave connection relationship;
a judging module, connected to the selection module, and configured to judge whether the upgrading manner of the slave node is the first manner or the second manner, and configured to generate a corresponding judgement result;
a first upgrade module, connected to the judging module and the download module, and configured to control the master node to flash and restore the differential upgrading file and to send the differential upgrading file to the slave node when the judgment result shows that the upgrading manner of the slave node is the first manner, so that the slave node completes upgrading;
a second upgrade module, connected to the judging module and the download module, and configured to control the master node to directly send the differential upgrading file to the slave node for upgrading when the judgment result shows that the upgrading manner of the slave node is the second manner.

Preferably, the upgrade scheme comprises an upgrade sequence and connection conditions;
the acquisition module for determining the master-slave relationship between two of the plurality of nodes to be upgraded in this upgrading, according to the upgrade sequence;
the first upgrade module or the second upgrade module, for the two of the plurality of nodes to be upgraded having the master-slave connection relationship in this upgrade, the master node determines whether the slave node satisfies the corresponding connection relationship, and if the slave node satisfies the connection relationship, a connection is established between the master node and the slave node.

Preferably, the current version data of the slave node is pre-stored in a slave storage area of the slave node;
the first upgrade module comprises:
a first acquisition module, for every two of the plurality of nodes to be upgraded having the master-slave connection relationship, the first acquisition module is configured to control the master node to acquire the differential upgrading file and send an upgrade request to the slave node;
a first restarting unit, connected to the first acquisition unit, and configured to control the master node to receive an approval request from the slave node, and to control the master node and the slave node to enter an upgrading mode at the same time according to the approval request;

a master-slave connection unit, connected to the first restarting unit, and configured to control the master node to connect to the slave node according to the master-slave connection relationship;

a second acquisition unit, connected to the master-slave connection unit, and configured to control the master node to obtain the current version data of the slave node and store the current version data in the main storage area of the master node;

an analyzing unit, connected to the second acquisition unit, and configured to control the master node to analyze the differential upgrading file to acquire differential block upgrade data corresponding to the plurality of main differential storage blocks in which the current version data in the main storage area is upgraded and changed;

a first flashing unit, connected to the analyzing unit, and configured to control the master node to flash and restore the current version data in all the plurality of main differential storage blocks according to the difference block upgrading data, to obtain flashed and restored upgrading version data;

a sending unit, connected to the first flashing unit, and configured to control the master node to send all the differential block upgrade data to a respective slave differential storage block in which the current version data changes in the slave storage area, so that the slave node completes upgrading.

Preferably, the current version data of the slave node is pre-stored in a slave storage area of the slave node;

the second upgrade module comprises:

a third acquisition unit for controlling the slave node to acquire the differential upgrading file sent directly by the master node;

a second restarting unit, connected to the third acquisition unit, and configured to control the slave node to restart and to enter an upgrading mode;

a second flashing unit, connected to the second restarting unit, and configured to control the slave node, according to the differential upgrading file, to obtain a plurality of slave differential storage blocks in which the current version data changes in the slave storage area, and flash the current version data in all the slave differential storage blocks.

Preferably, the acquisition module comprises a judging unit for controlling the root node to analyze whether the node to be upgraded in this upgrading is the root node and generate a corresponding judgement result;

the download module comprises a fourth upgrade unit, wherein when the judgement result shows that the node to be upgraded in this upgrading is the root node, the fourth upgrade unit is configured to control the root node to restart and enter the upgrading mode, and obtain, according to the differential upgrading file, a plurality of root differential storage blocks in which the current version data changes in the root storage area of the root node, and flash the current version data in all the root differential storage blocks.

By adopting the above-mentioned technical solutions, the present invention has the beneficial effects that an OTA differential upgrade method and system is provided, the differential upgrade is achieved by using the master and slave nodes. In this way, advantages of the master-slave structure are maximized, so that the flashing rate is increased, the upgrading cycle is shortened, and the upgrading stability is ensured.

DETAILED DESCRIPTION

The technical solution set forth in the embodiments of the present invention will now be described clearly and fully hereinafter with reference to the accompanying drawings of the embodiments of the present invention. Obviously, such embodiments provided in the present invention are only part of the embodiments instead of all embodiments. It should be understood that all the other embodiments obtained from the embodiments set forth in the present invention by one skilled in the art without any creative work fall within the scope of the present invention.

Notably, the embodiments set forth in the present invention and features of the embodiments may be combined in any suitable manner.

The present invention will be described hereinafter with reference to the accompanying drawings and particular embodiments, but the invention is not limited thereto.

Figure 1:
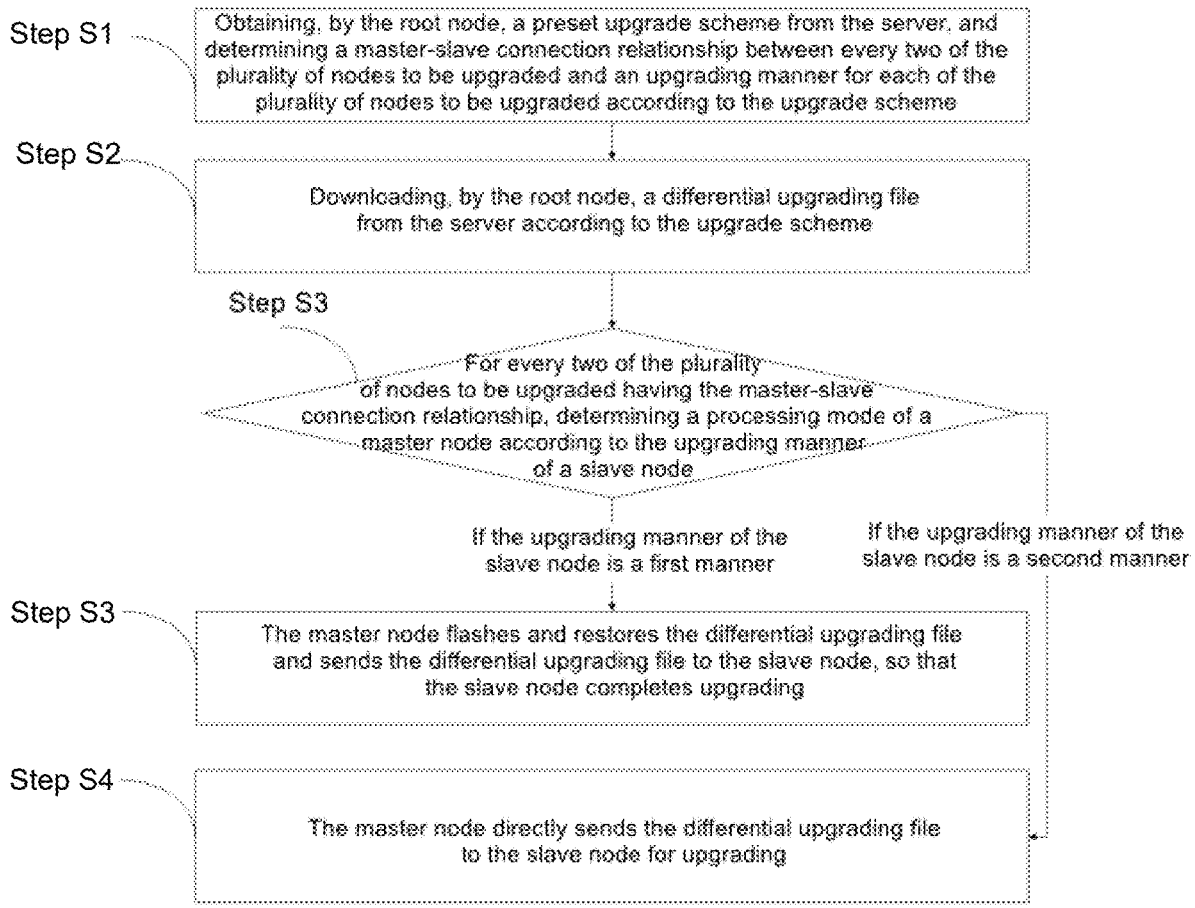
FIG. 1 is a schematic flowchart of an OTA differential upgrade method in a preferred embodiment of the present invention.

The invention provides an OTA differential upgrade method and system of a master-slave architecture. An OTA differential upgrade method of a master-slave architecture comprises a server and a plurality of nodes to be upgraded, wherein the plurality of nodes to be upgraded comprise a root node;

As shown in FIG. 1, the OTA differential upgrade method comprises:

Step S1, obtaining, by the root node, a preset upgrade scheme from the server, and determining a master-slave connection relationship between every two of the plurality of nodes to be upgraded and an upgrading manner for each of the plurality of nodes to be upgraded according to the upgrade scheme;

Step S2, downloading, by the root node, a differential upgrading file from the server according to the upgrade scheme;

Step S3, for every two of the plurality of nodes to be upgraded having the master-slave connection relationship, determining a processing mode of a master node according to the upgrading manner of a slave node;

if the upgrading manner of the slave node is a first manner, then turn to Step S4;

if the upgrading manner of the slave node is a second manner, then turn to Step S5;

Step S4, the master node flashes and restores the differential upgrading file and sends the differential upgrading file to the slave node, so that the slave node completes upgrading;

Step S5, the master node directly sends the differential upgrading file to the slave node for upgrading.

In particular, in order to make full use of advantages of the master-slave architecture, increase the upgrading rate, shorten the upgrading time and ensure the upgrading stability, the invention provides an OTA differential upgrade method. In this method, an upgrade scheme for this upgrading is pre-set in the server. Step S1 is executed, and the root node is connected to the server in a wireless/wired manner, so as to obtain the upgrade scheme for this upgrading, determining all the nodes to be upgraded, the master-slave connection relationship between every two of the plurality of nodes to be upgraded, and an upgrading manner of each of the plurality of nodes to be upgraded in this upgrading according to the upgrade scheme; Step S2 is executed, the root node downloads a differential upgrading file of the node to be upgraded from the server according to the plurality of nodes to be upgraded mentioned in the upgrade scheme; Step S3 is executed, for every two of the plurality of nodes to be upgraded having the master-slave connection relationship, it can be determined a processing mode of a node to be upgraded, as the master node, is according to the upgrading manner of a node to be upgraded, as the slave node, in this master-slave connection relationship, that is to say, if the upgrading manner of the slave node is a first manner, that is, if the slave node is upgraded with the help of the master node, then turn to Step S4; the master node flashes and restores the differential upgrading file and correspondingly sends the differential upgrading file to the slave differential storage blocks where the current version data stored in the slave node is upgraded and changed, so that the slave node completes upgrading directly; if the upgrading manner of the slave node is a second manner, that is, if the slave node can be upgraded simply by its own upgrading capabilities, then turn to Step S5, the master node directly sends the differential upgrading file to the slave node, then the slave node is upgraded according to the differential upgrading file.

Furthermore, steps of the invention can be repeated in sequence, that is, the current node to be upgraded is obtained and upgraded, and then the next node to be upgraded is upgraded; a plurality of nodes to be upgraded can also be obtained in parallel, and upgraded simultaneously.

Furthermore, the slave node upgrade method in Step S3 may be preset in the upgrade scheme, that is, the upgrade scheme may include the upgrade manners of all nodes to be upgraded involved in this upgrading. The root node analyzes the upgrade scheme to obtain the upgrading manners for all the nodes to be upgraded in this upgrading. Each of the nodes can be marked in advance, and the upgrading manner for each of the nodes can be determined by the marks. The master node can also monitor a current load of the slave node in real time, and judge whether it can withstand the upgrading according to the load occupancy, and then select a corresponding upgrading manner That is to say, for two nodes to be upgraded having a master-slave connection relationship, the master node can select the upgrading manner for the slave node in advance according to default information reported by the slave node, or can select the upgrading manner for the slave node through a business logic session interaction. The business logic session process is carried out as follows: the master node sends an upgrade request to inform the slave node after an upgrade package is downloaded, and the slave node selects to respond to one type of upgrading manners according to its own conditions. If a response parameter is 0, then the slave node is upgraded by a first upgrade manner; if a response parameter is 1, then the slave node is upgraded by a second upgrade manner. The master node determines the upgrading manner according to the received response parameter. Furthermore, the response parameter is not limited to these two values. For example, when the parameter is 2, it may represent that the slave node is upgraded with the support of a third party.

It should be noted that a node to be upgraded functions as a master node or a slave node, is not always fixed, and it plays a different role, which works as a master role or a slave role, in different master-slave connection relationships. In the present invention, processing mode of the master node is always determined by the upgrading manner for the slave node in the current master-slave relationship. For example, the nodes to be upgraded comprise A20, A30 and A31, A1 is directly connected to A20, and A20 is connected to A30 and A31. For the upgrading manner for node A20 to be upgraded, considering the node A 20 to be upgraded is adopted as a slave node in a master-slave connection relationship between A1 and A20, and it is adopted as a master node in a master-slave connection relationship between A20 and A30 or between A30 and A31, therefore, when the node A20 to be upgraded is upgraded, processing mode of a corresponding master node A1 is determined by the upgrading manner of the node A 20 to be upgraded as the slave node. That is to say, if the upgrading manner of the node A 20 to be upgraded is the first manner, the master node A1 flashes and restores the differential file and sends the differential file to the node A20; if the upgrading manner of the node A 20 to be upgraded is the second manner, the master node A1 directly sends the differential file to the slave node A20, the slave node A20 is upgraded by using its own capabilities.

Furthermore, in the present invention, it is selected to process every two of the plurality of nodes to be upgraded having a master-slave connection relationship, without considering other master-slave connection relationships of the nodes to be upgraded in this master-slave connection relationship. For example, the above mentioned nodes to be upgraded comprise A1, A20, A30 and A31, A1 is directly connected to A20, and A20 is connected to A30 and A31. For the node A30 to be upgraded, it is only necessary to consider the master-slave connection relationship between A20 and A31, and processing mode of a master node A20 is determined by an upgrading manner for the slave node A30 to be upgraded, without considering other master-slave connection relationships of the nodes A30 or A20 to be upgraded, for example, a master-slave connection relationship between A1 and A20, and a master-slave connection relationship between A20 and A31. In other words, the nodes to be upgraded in the present invention can also be divided into multiple levels, such as a first-level master node, a first-level slave node, a second-level slave node, a third-level slave node, and so on. Correspondingly, the master node is A1, the first-level master node is A20, the second-level slave nodes are A30 and A31. When the first-level slave node A20 is upgraded, two nodes to be upgraded in the master-slave connection relationship are the first-level master node A1 and the first-level slave node A20. Here, the first-level master node A1 is a master node in the master-slave connection relationship, and the first-level slave node A20 is a slave node in the master-slave connection relationship; when the second-level slave node A30 is upgraded, two nodes to be upgraded in the master-slave connection relationship are the first-level slave node A2 and the second-level slave node A30. Here, the first-level slave node A2 is a master node in the master-slave connection relationship, and the second-level slave node A30 is a slave node in the master-slave connection relationship.

The nodes to be upgraded here refer to a plurality of controllers and a plurality of processors arranged in one device, or can be a device. The root node can be a plurality of nodes in a multi-mode device, which is capable of interacting with the outside for information exchange, such as an LAN module, an IP network module, etc.

In a preferred embodiment of the present invention, the upgrade scheme comprises an upgrade sequence and connection conditions;

in Step S1, the root node determines the master-slave relationship between two of the plurality of nodes to be upgraded in this upgrading, according to the upgrade sequence;

in Step S4 or Step S5, for the two of the plurality of nodes to be upgraded having the master-slave connection relationship in this upgrading, the master node determines whether the slave node satisfies the corresponding connection relationship, and if the slave node satisfies the connection relationship, a connection is established between the master node and the slave node.

In particular, the upgrade scheme comprises the upgrade sequence, that is, the upgrade sequence of the nodes to be upgraded. Accordingly, in the present invention, a master-slave connection relationship can be built and the upgrading of the nodes to be upgraded can be completed in sequence. It should be noted that the upgrade sequence has nothing to do with the master-slave connection structure of the nodes to be upgraded. For example, the above-mentioned nodes to be upgraded comprise A1, A20, A30 and A31. A1 is directly connected to A20, and A20 is connected to A30 and A31. In the master-slave connection relationship between A20 and A30, A30 is a slave node, and A2 is a master node, however, A30 can be upgraded after A2 or before A2.

The upgrade scheme further comprises connection conditions associated with the upgrade sequence. The currently involved slave nodes are determined according to the upgrade sequence, and it is determined whether the current slave node meets the upgrade conditions, if yes, a connection between the master node and the slave node is established. The upgrade conditions may comprise the current resource utilization rate of the slave node, the degree of idleness of the slave node, and the remaining power of the device corresponding to the slave node, and may further comprise current ambient temperature, current time, and other conditions.

Figure 2:
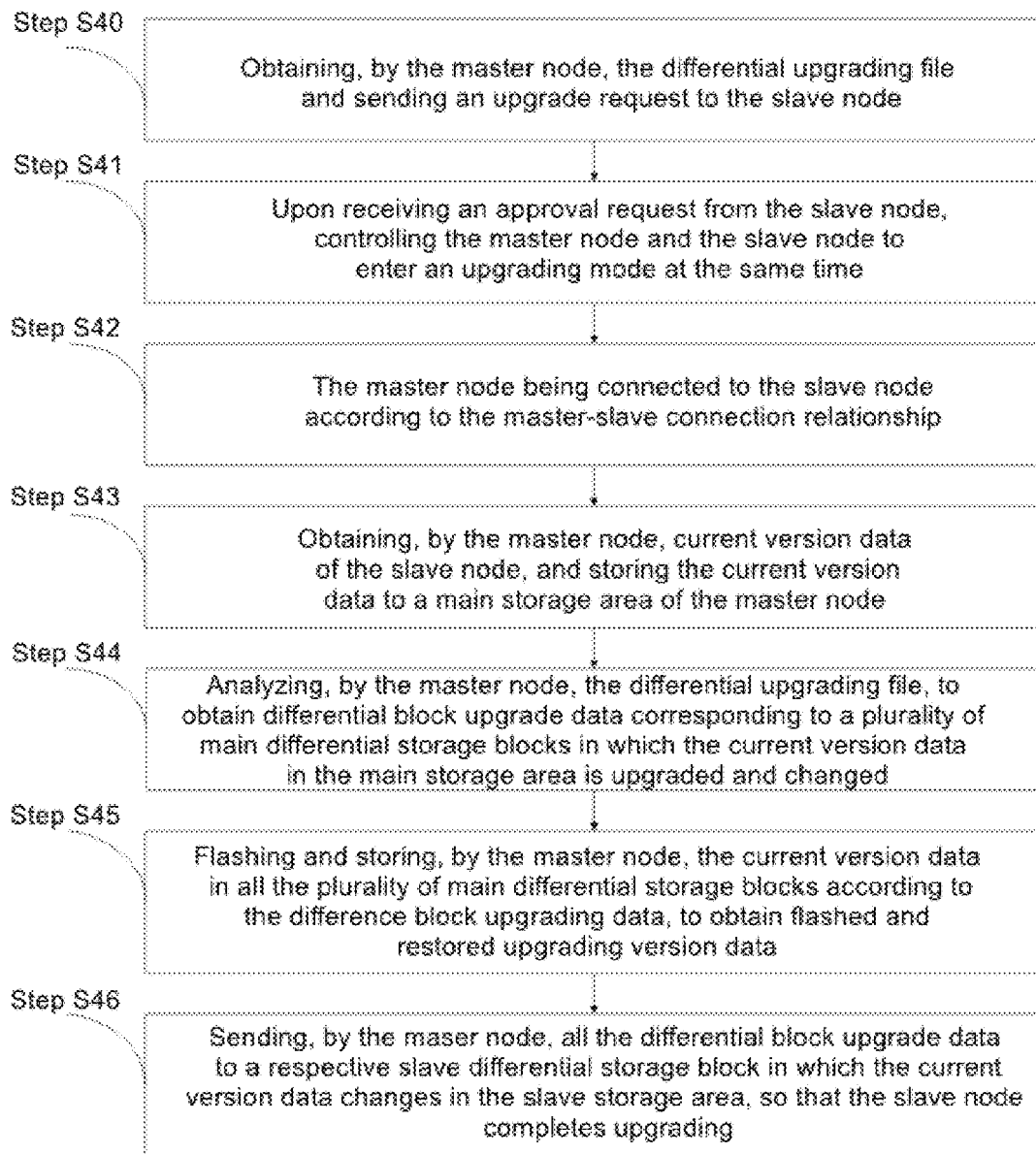
FIG. 2 is a schematic flowchart of Step S4 in a preferred embodiment of the present invention.

In a preferred embodiment of the present invention, current version data of the slave node is pre-stored in a slave storage area of the slave node;

as shown in FIG. 2, in Step 4, for every two of the plurality of nodes to be upgraded having the master-slave connection relationship, Step S4 specifically comprises the steps of:

Step S40, obtaining, by the master node, the differential upgrading file and sending an upgrade request to the slave node;

Step S41, upon receiving an approval request from the slave node, controlling the master node and the slave node to enter an upgrading mode at the same time;

Step S42, the master node being connected to the slave node according to the master-slave connection relationship;

Step S43, obtaining, by the master node, current version data of the slave node, and storing the current version data to a main storage area of the master node;

Step S44, analyzing, by the master node, the differential upgrading file, to obtain differential block upgrade data corresponding to a plurality of main differential storage blocks in which the current version data in the main storage area is upgraded and changed;

Step S45, flashing and storing, by the master node, the current version data in all the plurality of main differential storage blocks according to the difference block upgrading data, to obtain flashed and restored upgrading version data;

Step S46, sending, by the maser node, all the differential block upgrade data to a respective slave differential storage block in which the current version data changes in the slave storage area, so that the slave node completes upgrading.

In particular, when the upgrading manner for the slave node is a first upgrade manner, that is, when the slave node relies on the master node to complete the upgrading, the master node flashes and restores the differential file and sends it to the slave node, so that the slave node completes upgrading. First of all, Step S40 can be executed. The master node obtains the differential upgrading file downloaded from the server, and generates an upgrade request according to the differential upgrading file and sends the upgrade request to the slave node. Upon receiving the upgrade request, the slave node can generate an approval request or a reject request according to the current situation and feed it to the master slave. Step S41 is executed, in practice, a Bootloader can be used to guide a startup program, that is, when the master node receives the approval request fed by the slave node, the master node and the slave node correspondingly jump upgrading modes for upgrading. Step S42 is executed, a master-slave connection between the master node and the slave node is established, and furthermore, it can be judged whether the slave node satisfies the connection conditions in the upgrade scheme, and after the slave node satisfies the connection conditions, the master node is connected to the slave node. Then Step S43 is executed, the master node obtains the current version data of the slave node and stores it in the main storage area of the master node. It should be noted that the current version data of the slave node here is a full version data of the slave node. Then Step S44-Step S45 are executed, the master node analyzes the current version data of the slave node and the differential upgrading file associated with the upgrading of the slave node, and determines the master differential storage blocks in which the current version data changes in the main storage area, and obtains differential block upgrade data corresponding to the master differential storage blocks. The master node then flashes and restores the current version data in all the master differential storage blocks according to the differential block upgrade data, to obtain the upgrading version data subjected to the flashing and restoring process, that is, the main storage area comprises a plurality of master storage blocks for storing the current version data of the slave nodes. The master storage blocks of all the master storage blocks, in which the version data changes, serve as the master differential storage blocks, and it analyzes the differential upgrading file to obtain the differential block upgrade data corresponding to the master differential storage blocks. Flash version data in the master differential storage blocks according to the differential block upgrade data. The flashed and restored version data is the version number of the upgraded slave node. The last step is to execute Step S46, the differential block upgrade data corresponding to the master difference storage blocks is correspondingly sent to the slave differential storage blocks whose version data of the slave node will be upgraded in this upgrading, the master differential storage blocks store the current version data of the slave node. Accordingly, the differential block upgrade data not only corresponds to the master differential storage blocks, but also corresponds to the slave differential storage blocks of the slave node. Therefore, the master node sends the differential block upgrade data to the slave differential storage blocks in the slave node, so that after the slave node receives the differential block upgrade data, the slave node is upgraded, that is to say, by using the first upgrade manner, the slave node can be upgraded directly by relying on the master node without performing upgrading and flashing processes in the slave node.

Figure 3:
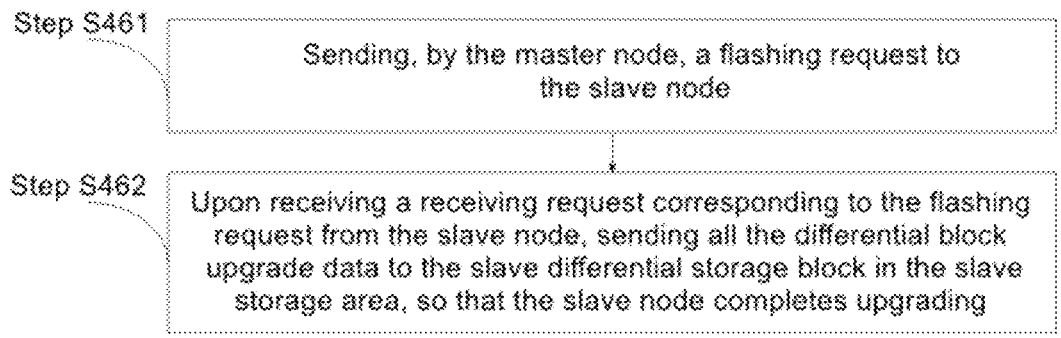
FIG. 3 is a schematic flowchart of Step S46 in a preferred embodiment of the present invention.

As shown in FIG. 3, in a preferred embodiment of the invention, Step S46 comprises:

Step S461, sending, by the master node, a flashing request to the slave node;

Step S462, upon receiving a receiving request corresponding to the flashing request from the slave node, sending all the differential block upgrade data to the slave differential storage block in the slave storage area, so that the slave node completes upgrading.

In particular, after completing the flashing and restoring of all the master differential storage blocks, the master node generates a flashing request and sends it to the slave node, the slave node receives the flashing request, and generates a receiving request or a reject request according to the present running condition and sends it to the master slave. When the master node receives the receiving request, it will send all the differential block upgrade data correspondingly to the slave differential storage blocks of the slave node according to the connection constructed by the master node and the slave node, so that the slave node can directly complete upgrading.

Figure 4:
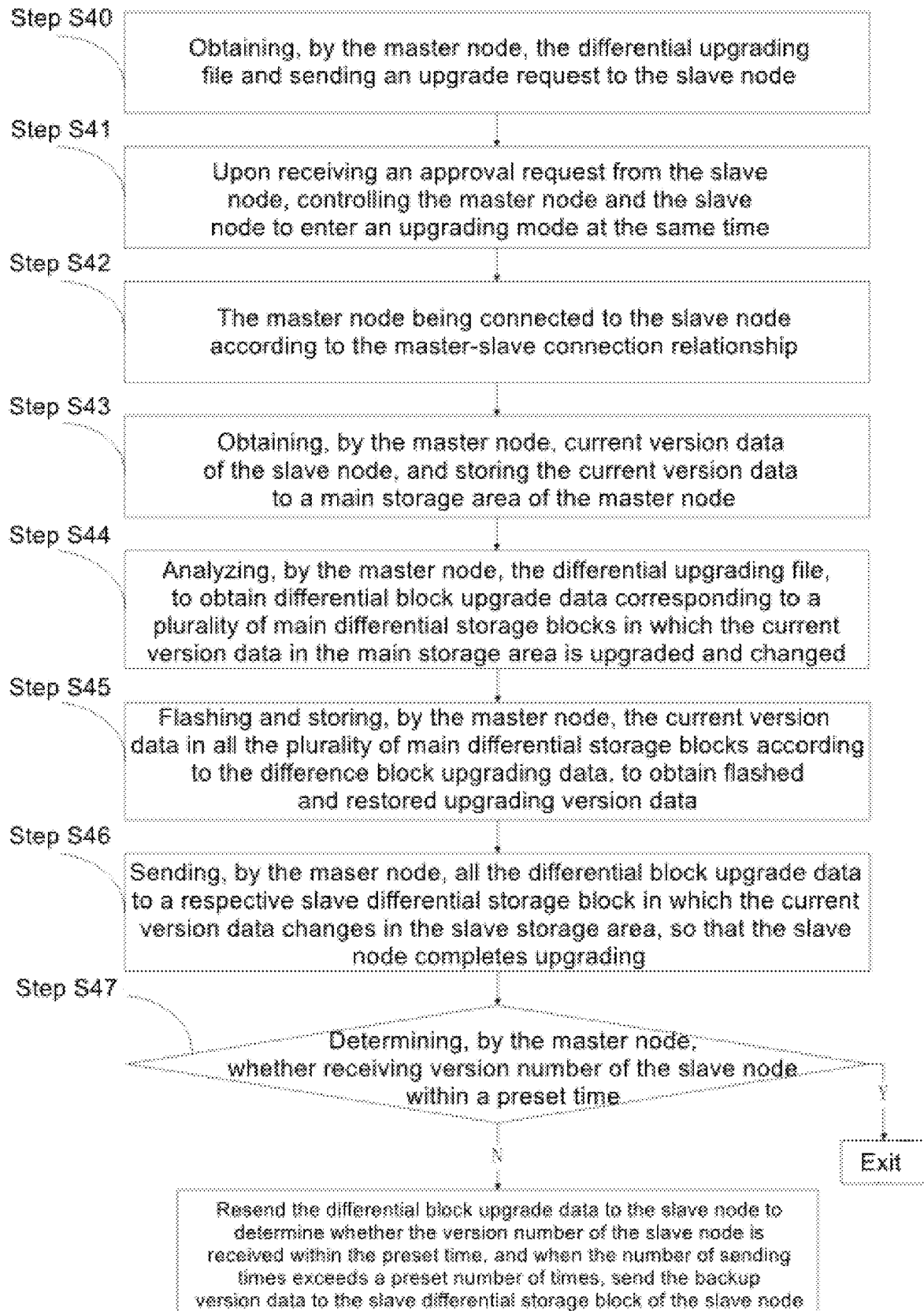
FIG. 4 is a schematic flowchart of Step S47 in a preferred embodiment of the present invention.

As shown in FIG. 4, in a preferred embodiment of the present invention, Step S44 further comprises:

performing, by the master node, a backup storage of the current version data in the plurality of the main differential storage blocks, to generate a backup version data;

Step S46 is followed by Step S47;

Step S47, determining, by the master node, whether receiving version number of the slave node within a preset time:

if yes, exit the process;

if not, resend the differential block upgrade data to the slave node to determine whether the version number of the slave node is received within the preset time, and when the number of sending times exceeds a preset number of times, send the backup version data to the slave differential storage block of the slave node.

In particular, when the master node analyzes the differential upgrading file to determine the master differential storage blocks and the current version data of the master differential storage blocks, the master node can perform backup of the current version data of the master differential storage blocks to obtain backup version data. After the slave node receives the differential block upgrade data sent by the master node to flash the differential storage blocks, it is determined whether the version number of the slave node is received by the master node within the preset time, if yes, exit the process, if not, perform a retry mechanism, that is, re-send the data of the differential blocks to the slave node to re-judge whether the version number of the slave node is received within the preset time, and it is still not successful when the preset number of times is reached, that is, the differential block upgrade data is sent to the slave node for multiple times, if the version number of the slave node is not received for each time, a rollback process is started. The master node will send the backup version data, that is, the source data of the slave node, to the slave node, that is to say, the master node directly sends version data of each block to a corresponding storage position.

Furthermore, the rollback process is carried out as follows: the master node can, according to the backup version data, directly flash all the slave differential storage blocks of the slave node from the first slave differential storage block to the last slave differential storage block; the master node can analyze reasons for the failure of the restart of the slave node, that is, re-flash the slave differential storage blocks in all the slave differential storage blocks failing to flash as expected.

Figure 5:
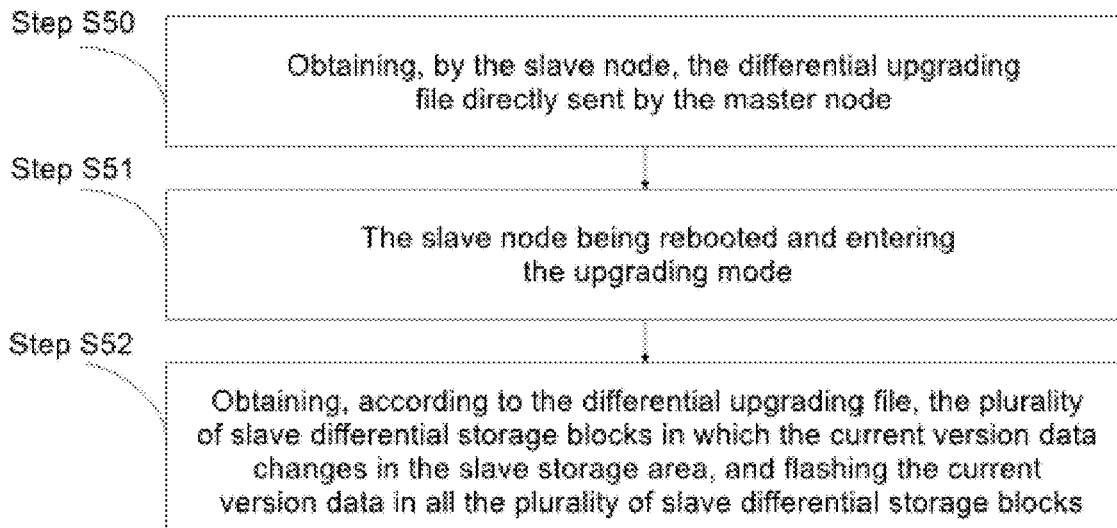
FIG. 5 is a schematic flowchart of Step S5 in a preferred embodiment of the present invention.

In a preferred embodiment of the present invention, the current version data of the slave node is pre-stored in the slave storage area of the slave node;

as shown in FIG. 5, in step S5, for every two of the plurality of nodes to be upgraded having the master-slave connection relationship, Step S5 specifically comprises the steps of:

Step S50, obtaining, by the slave node, the differential upgrading file directly sent by the master node;

Step S51, the slave node being rebooted and entering the upgrading mode;

Step S52, obtaining, according to the differential upgrading file, the plurality of slave differential storage blocks in which the current version data changes in the slave storage area, and flashing the current version data in all the plurality of slave differential storage blocks.

In particular, when the upgrading manner for the slave node is the second upgrade manner, that is, when the slave node is upgraded by using its own upgrading capabilities, the master node directly sends the differential upgrading file to the slave node, and the slave node completes the upgrade according to the differential upgrading file. First of all, the master node directly sends the differential upgrading files to the slave node, and notifies the slave node after all the files are sent, the slave node restarts and enters the upgrading mode, and it is upgraded in the upgrading mode. The slave node obtains, according to the differential upgrading files, the slave differential storage blocks whose current version data changes in the slave storage area, and flashes all the slave differential storage blocks according to the differential upgrading files, so that the slave node can be upgraded by itself.

Of note, in the first upgrade manner, the master node sends the differential block upgrade data, and in the second upgrade manner, the master node sends the differential upgrading file. The differential upgrading file may comprise the differential block upgrade data and a differential block identifier corresponding to each differential block upgrade data, that is to say, in the first upgrade manner, the master node analyzes the differential upgrading file to obtain the differential block upgrade data corresponding to each differential storage block, so as to carry out targeted flashing. After flashing, the differential block upgrade data in the differential upgrading file is directly sent to the slave differential storage block in the slave node, wherein the slave differential storage block needs to be upgraded, which thus leads to the change of data, so that the slave node directly completes upgrading. In the second upgrade manner, the master node sends the differential upgrading file to the slave node, the slave node analyzes the differential upgrading file to obtain the differential block identifier and the differential block upgrade data, and upgrades the slave differential storage blocks of the slave node according to the differential block identifier and the differential upgrade data.

It should be further noted that the backup version data can also be sent by the server. For example, under normal circumstances, the server sends a differential upgrade package that is the difference between a version before upgrading and a version after upgrading. It can simultaneously send a reverse differential package between a version after upgrading and a version before upgrading, that is, the backup version data.

Furthermore, in prior to performing Step S50, the master node will establish a connection with the slave node, and sends a sending request to the slave node. After the slave node feeds back the approval request to the master node, the master node will directly send the differential upgrading file to the slave node.

Figure 6:
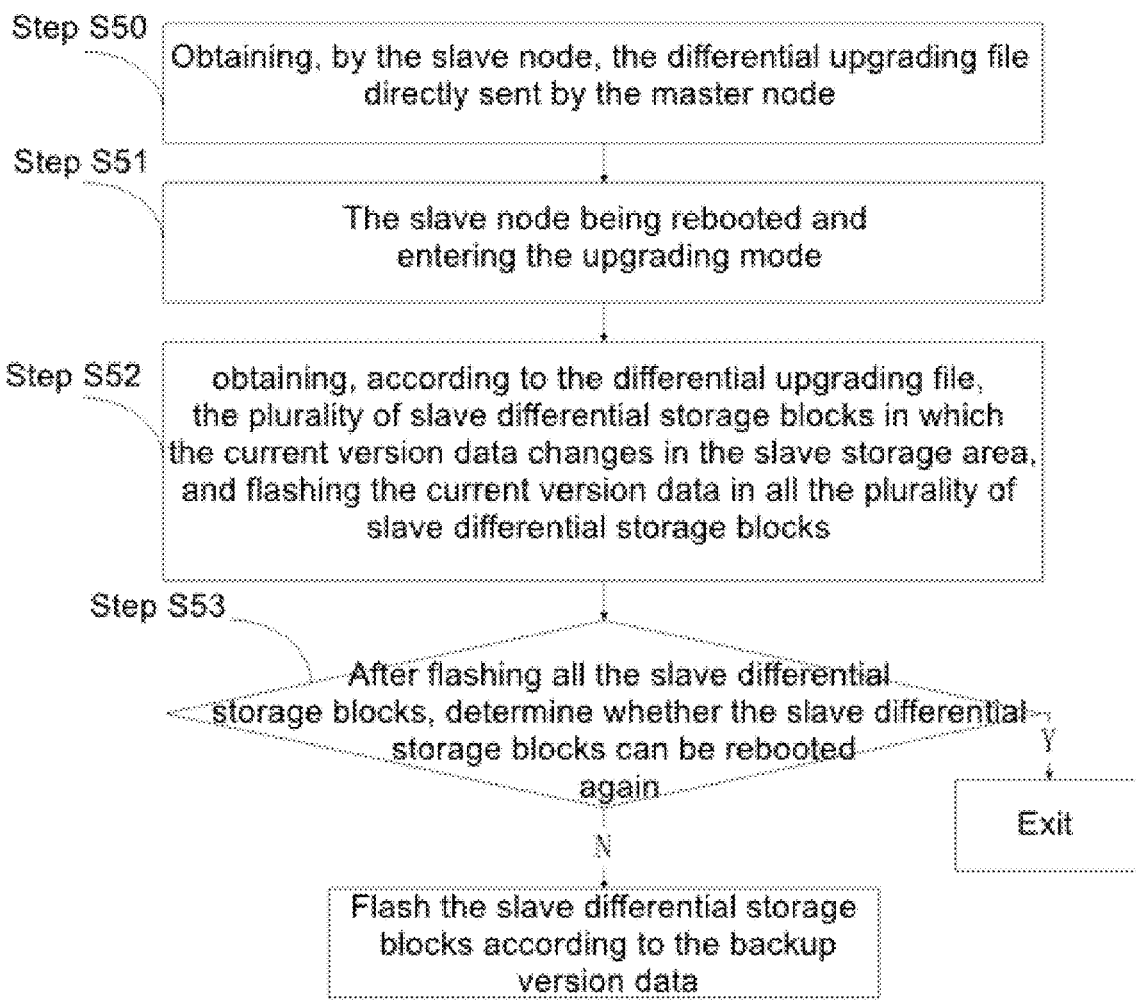
FIG. 6 is a schematic flowchart of Step S53 in a preferred embodiment of the present invention.

As shown in FIG. 6, in a preferred embodiment of the present invention, Step S52 further comprises:
performing a backup of the current version data in the slave differential storage blocks to generate backup version data;
Step S52 is followed by Step S53;
Step S53, after flashing all the slave differential storage blocks, it is determined whether the slave differential storage blocks can be rebooted again;
if yes, exit the process;
if not, flash the slave differential storage blocks according to the backup version data.

In a preferred embodiment of the present invention, a process of performing a backup of the current version data in the slave differential storage blocks comprises:
determining whether storage resources of the slave node meet a preset backup threshold:
if yes, store the backup version data in the slave storage area;
if not, store the backup version data in the main storage area of the master node.

In particular, for the upgrading manner by which the slave node is upgraded with itself, two different backup rollback mechanisms can be set to facilitate the flashing when the slave node fails to restart, that is, before flashing the slave differential storage blocks of the slave node according to the differential upgrading file, it is determined whether storage resources of the slave node meet the preset backup threshold, if yes, the backup version data will be stored in the slave storage area in advance, and after the slave node fails to restart, the backup version data in the slave storage area flashes the slave differential storage block of the slave storage area; if not, the backup version data is stored in the main storage area of the master node, and after the slave node fails to restart, the backup version data in the main storage area flashes the slave differential storage blocks of the slave storage area.

In a preferred embodiment of the present invention, a verification step is executed before Step S43 or Step S52;
the verification step comprises:
determining whether a file verification value of the differential upgrading file is consistent with a data verification value of the current version data:
if yes, the verification is passed and continue to perform subsequent steps;
if not, the verification is not passed, and exit the process.

In particular, in order to avoid the upgrade failure caused by the loss or transmission error of the differential upgrading file, a verification step can be performed before flashing, that is, to determine whether a file verification value of the differential upgrading file is consistent with a data verification value of the current version data, if yes, the verification is passed, the differential upgrading file is complete and correct, and the upgrading can be performed according to the differential upgrading file, if not, the verification is not passed, then it means loss or mis-uploading of the differential upgrading file occurs, and exit the process.

In a preferred embodiment of the present invention, in Step S1, when the root node analyzes the node to be upgraded in this upgrading is only the root node;
in Step S2, the root node restarts and enters the upgrading mode, and obtains a plurality of root differential storage blocks where the current version data changes in a root storage area of the root node, and flashes the current version data in all the plurality of root differential storage blocks.

In particular, when the root node is upgraded, it can be directly flashed and restored according to the differential upgrading file downloaded by the server to complete the upgrade. The flashing process is: analyzing, according to the differential upgrading file, to obtain a plurality of root differential storage blocks whose version data changes in the root storage area of the root node, and flashing the current version data in all the root differential storage blocks according to the differential upgrading file.

Figure 7:
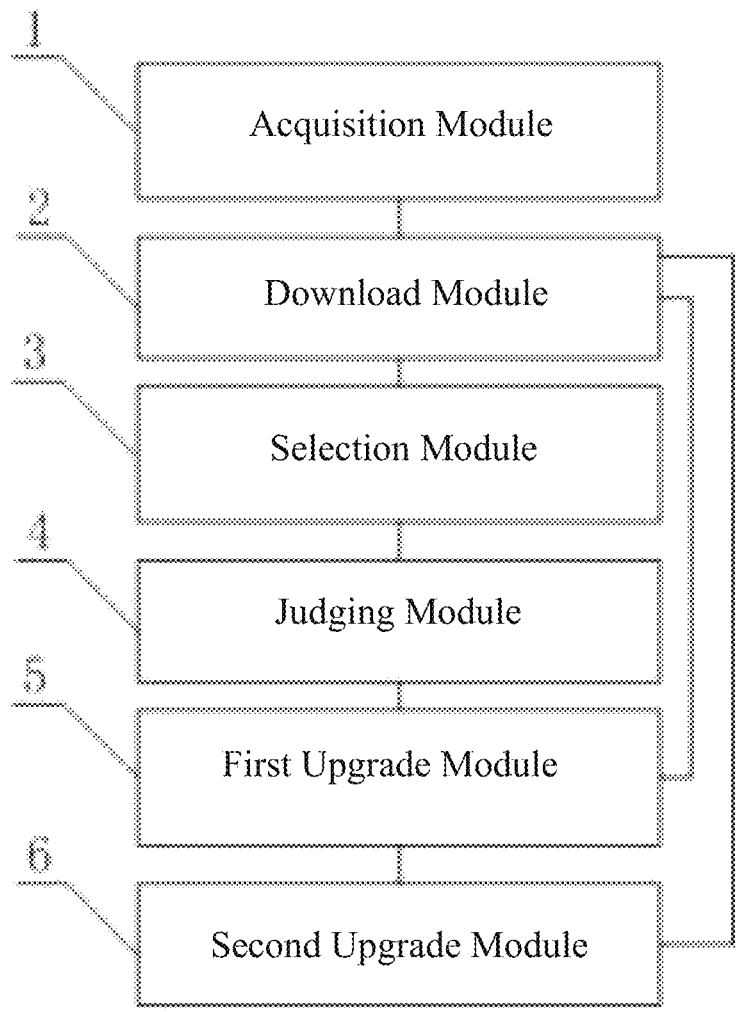
FIG. 7 is a schematic structural diagram of an OTA differential upgrade method in a preferred embodiment of the present invention.

An OTA differential upgrade system of a master-slave architecture, comprising a server and a plurality of nodes to be upgraded, wherein the plurality of nodes to be upgraded comprise a root node;
as shown in FIG. 7, the OTA differential upgrade system comprises:
an acquisition module 1 for acquiring a preset upgrade scheme from the server, and determining a master-slave connection relationship between two of the plurality of nodes to be upgraded and an upgrading manner for each of the plurality of nodes to be upgraded according to the upgrade scheme;
a download module 2, connected to the acquisition module 1, and configured to download a differential upgrading file from the server according to the upgrade scheme;
a selection module 3, connected to the download module 2, and configured to determine a processing mode of a master node according to the upgrading manner of a slave node for every two of the plurality of nodes to be upgraded having the master-slave connection relationship;
a judging module 4, connected to the selection module 3, an configured to judge whether the upgrading manner of the slave node is the first manner or the second manner, and configured to generate a corresponding judgement result;
a first upgrade module 5, connected to the judging module 4 and the download module 2, and configured to control the master node to flash and restore the differential upgrading file and to send the differential upgrading file to the slave node when the judgment result shows that the upgrading manner of the slave node is the first manner, so that the slave node completes upgrading;

a second upgrade module 6, connected to the judging module 4 and the download module 2, and configured to control the master node to directly send the differential upgrading file to the slave node for upgrading when the judgment result shows that the upgrading manner of the slave node is the second manner.

In particular, the invention provides an OTA differential upgrade system of a master-slave architecture. The system downloads the differential upgrading file from the server through the acquisition module 1, the download module 2, the selection module 3, the judging module 4, the first upgrade module 5 and the second upgrade module 6, and it relies on the master node or its own upgrading capabilities to complete upgrading. Wherein, details about the upgrading process have been illustrated above, so it will not be repeated herein.

In a preferred embodiment of the present invention, the upgrade scheme comprises an upgrade sequence and connection conditions;

the acquisition module 1 for determining the master-slave relationship between two of the plurality of nodes to be upgraded in this upgrade, according to the upgrade sequence;

the first upgrade module 5 or the second upgrade module 6, for the two of the plurality of nodes to be upgraded having the master-slave connection relationship in this upgrade, the master node determines whether the slave node satisfies the corresponding connection relationship, and if the slave node satisfies the connection relationship, a connection is established between the master node and the slave node.

Figure 8:
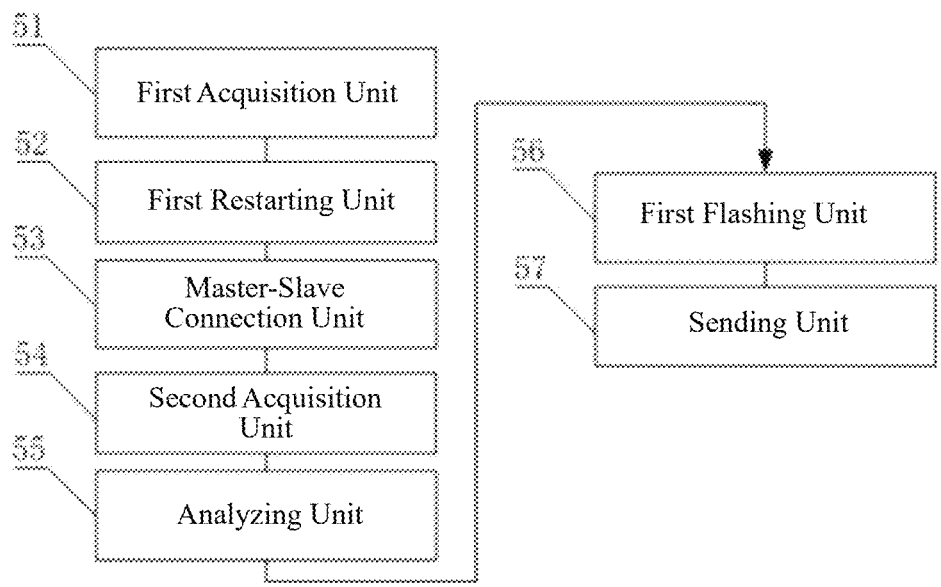
FIG. 8 is a schematic structural diagram of a first upgrade module in a preferred embodiment of the present invention.

In a preferred embodiment of the present invention, the current version data of the slave node is pre-stored in a slave storage area of the slave node;

as shown in FIG. 8, the first upgrade module 5 comprises:

a first acquisition module 51, for every two of the plurality of nodes to be upgraded having the master-slave connection relationship, the first acquisition module is configured to control the master node to acquire the differential upgrading file and send an upgrade request to the slave node;

a first restarting unit 52, connected to the first acquisition unit 51, and configured to control the master node to receive an approval request from the slave node, and to control the master node and the slave node to enter an upgrading mode at the same time according to the approval request;

a master-slave connection unit 53, connected to the first restarting unit 52, and configured to control the master node to connect to the slave node according to the master-slave connection relationship;

a second acquisition unit 54, connected to the master-slave connection unit 53, and configured to control the master node to obtain the current version data of the slave node and store the current version data in the main storage area of the master node;

an analyzing unit 55, connected to the second acquisition unit 54, and configured to control the master node to analyze the differential upgrading file to acquire differential block upgrade data corresponding to the plurality of main differential storage blocks in which the current version data in the main storage area is upgraded and changed;

a first flashing unit 56, connected to the analyzing unit 55, and configured to control the master node to flash and restore the current version data in all the plurality of main differential storage blocks according to the difference block upgrading data, to obtain flashed and restored upgrading version data;

a sending unit 57, connected to the first flashing unit 56, and configured to control the master node to send all the differential block upgrade data to a respective slave differential storage block in which the current version data changes in the slave storage area, so that the slave node completes upgrading.

In particular, through the first acquisition module 51, the first restarting unit 52, the master-slave connection unit 53, the second acquisition unit 54, the analyzing unit 55, the first flashing unit 56 and the sending unit 57, when the upgrading manner for the slave node is the first upgrade manner, that is, when the slave node relies on the master node to complete upgrading, after the master node flashes and restores the differential file, the corresponding differential block upgrade data is sent to the slave differential storage blocks of the slave node, so that the slave node completes upgrading.

Figure 9:
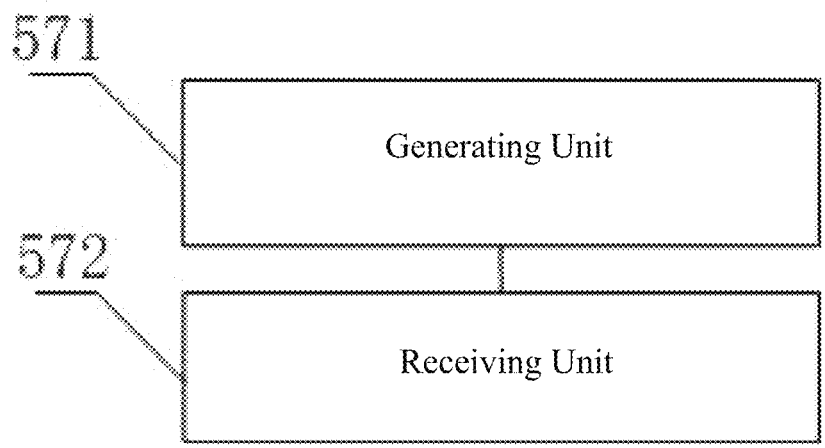
FIG. 9 is a schematic structural diagram of a sending unit in a preferred embodiment of the present invention.

As shown in FIG. 9, in a preferred embodiment of the present invention, the sending unit 57 comprises:

a generating unit 571 for controlling the master node to generate a flashing request and send it to the slave node;

a receiving unit 572 for controlling the master node to obtain a receiving request corresponding to the flashing request from the slave node, and correspondingly sending all the differential block upgrade data to the slave differential storage blocks in the slave storage area, so that the slave node completes upgrading directly.

Figure 10:
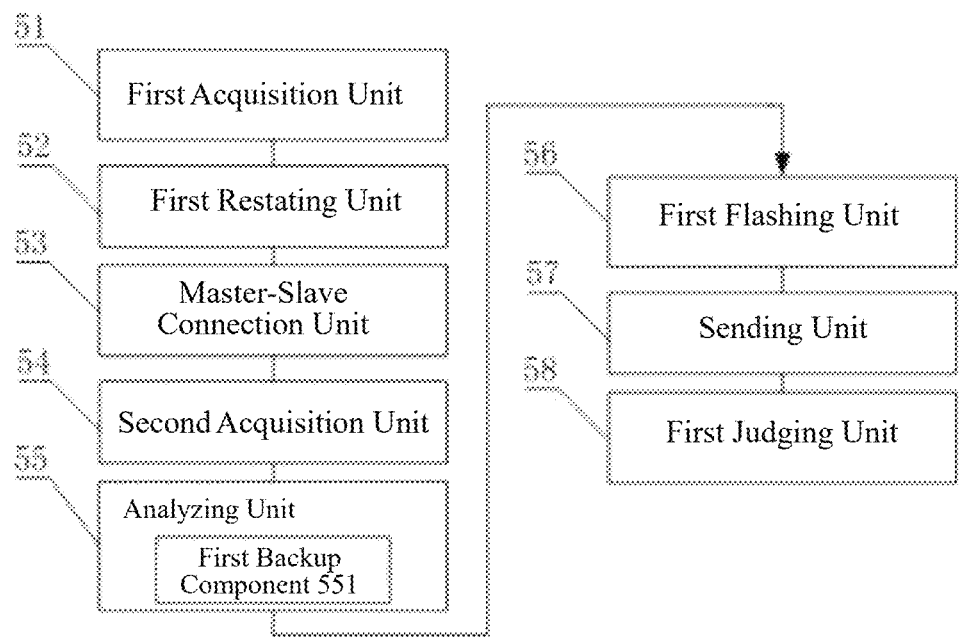
FIG. 10 is a schematic structural diagram of an analyzing unit in a preferred embodiment of the present invention.

As shown in FIG. 10, in a preferred embodiment of the present invention, the analyzing unit 55 further comprises:

a first backup component 551 for controlling the master node to perform a backup storage of the current version data of the main differential storage blocks to generate backup version data;

the first upgrade module 5 further comprises a first judging unit 58;

the first judging unit 58 is configured to control the master node to judge whether the version number of the slave node is received within the preset time; when the version number of the slave node is not received within the preset time, the differential block upgrade data is sent to the slave node again so as to judge whether the version number of the slave node is received within the preset time again, and when the number of sending times exceeds a preset number of times, send the backup version data to the slave differential storage blocks of the slave node.

Figure 11:
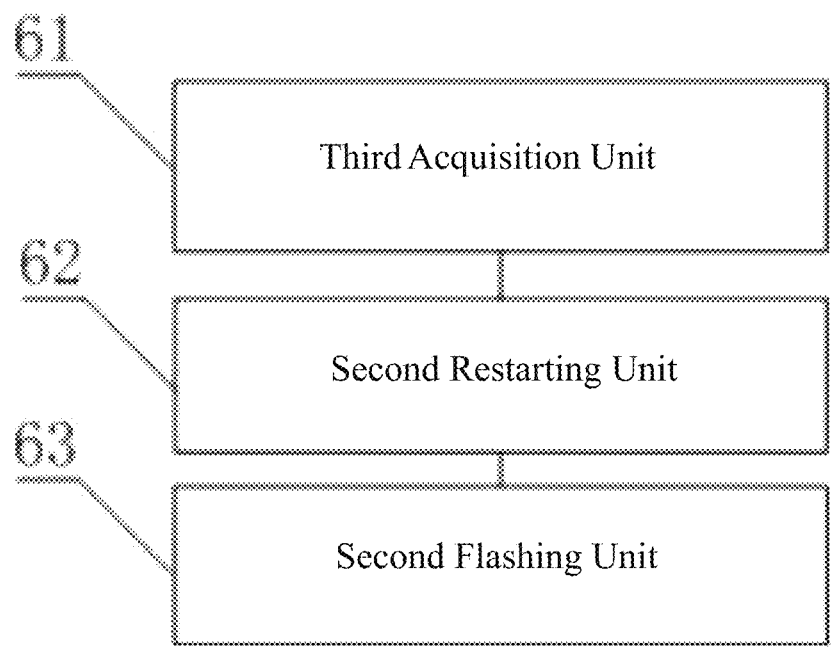
FIG. 11 is a schematic structural diagram of a second upgrade module in a preferred embodiment of the present invention.

In a preferred embodiment of the present invention, the current version data of the slave node is pre-stored in a slave storage area of the slave node;

as shown in FIG. 11, the second upgrade module 6 comprises:

a third acquisition unit 61 for controlling the slave node to acquire the differential upgrading file sent directly by the master node;

a second restarting unit 62, connected to the third acquisition unit 61, and configured to control the slave node to restart and to enter an upgrading mode;

a second flashing unit 63, connected to the second restarting unit 62, and configured to control the slave node, according to the differential upgrading file, to obtain a plurality of slave differential storage blocks in which the current version data changes in the slave storage area, and flash the current version data in all the slave differential storage blocks.

In particular, through the third acquisition unit 61, the second restarting unit 62 and the second flashing unit 63, when the upgrading manner for the slave node is the second upgrade manner, that is, when the slave node is upgraded by its own upgrading capabilities, the master node directly sends the differential file to the slave node, and the slave node is upgraded according to the differential upgrading file.

Figure 12:
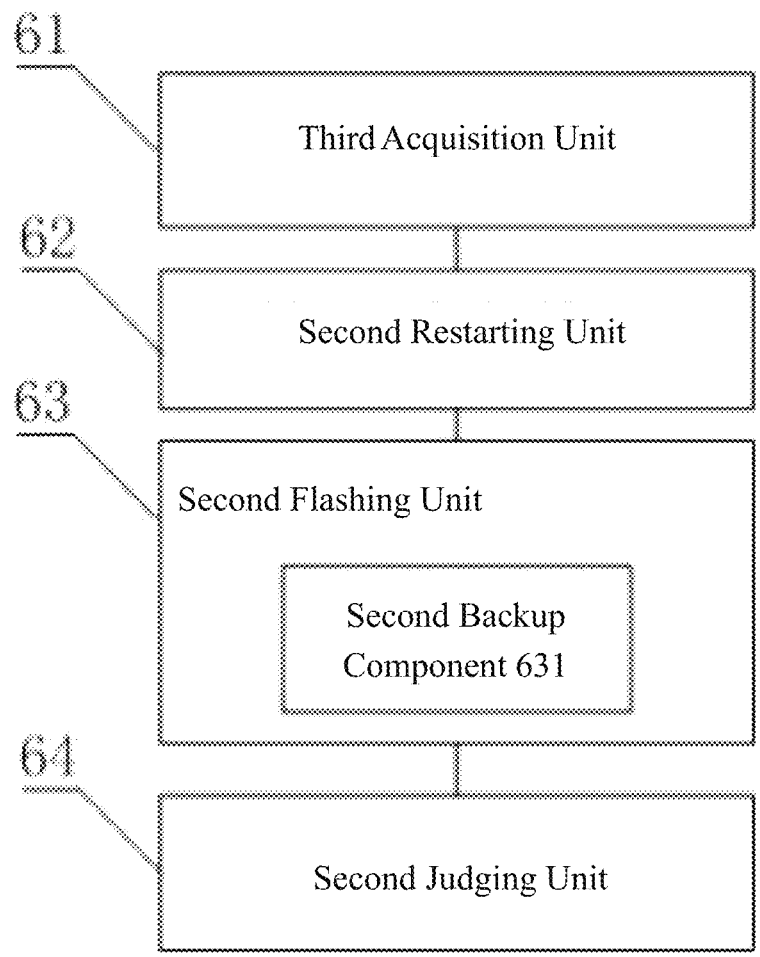
FIG. 12 is a schematic structural diagram of a second flashing unit in a preferred embodiment of the present invention.

As shown in FIG. 12, in a preferred embodiment of the present invention, the second flashing unit 63 comprises a second backup component 631;

wherein the second backup component 631 is connected to the third acquisition unit 61 for performing backup of the current version data in the differential storage blocks to generate backup version data;

the second upgrade module 6 further comprises a second judging unit 64;

the second judging unit 64 is connected to the second backup unit and the second flashing unit 63 for judging whether the slave node can be restarted again, and when a subsquent judgement result shows that the slave node cannot be restarted again, flashing the differential storage blocks according to the backup version data.

In a preferred embodiment of the present invention, the second backup component 631 comprises a storage judgment component;

the storage judgment component is configured to judge whether the storage resources of the slave node satisfy a backup threshold, and when the subsquent judgment result shows that it satisfies the backup threshold, the backup version data is stored in the slave storage area; and when the subsquent judgment result shows that it does not satisfy the backup threshold, the backup version data is stored in the main storage area.

In a preferred embodiment of the present invention, the acquisition module 1 comprises a judging unit for controlling the root node to analyze whether the node to be upgraded in this upgrading is the root node and generate a corresponding judgement result;

the download module 2 comprises a fourth upgrade unit, wherein when the judgement result shows that the node to be upgraded in this upgrading is the root node, the fourth upgrade unit is configured to control the root node to restart and enter the upgrading mode, and obtain, according to the differential upgrading file, a plurality of root differential storage blocks in which the current version data changes in the root storage area of the root node, and flash the current version data in all the root differential storage blocks.

The technical solution provided in the present invention has the advantages that an OTA differential upgrade method and system is provided, the differential upgrading is achieved by using the master and slave nodes. In this way, advantages of the master-slave structure are maximized, so that the flashing rate is increased, the upgrading cycle is shortened, and the upgrading stability is ensured.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. An Over-The-Air (OTA) differential upgrade method of a master-slave architecture, comprising:
a server and a plurality of nodes to be upgraded, wherein the plurality of nodes to be upgraded comprises a root node;
wherein the OTA differential upgrade method comprises:
Step S1, obtaining, by the root node, a preset upgrade scheme from the server, and determining a master-slave connection relationship between every two of the plurality of nodes to be upgraded and an upgrading manner for each of the plurality of nodes to be upgraded according to the upgrade scheme;
Step S2, downloading, by the root node, a differential upgrading file from the server according to the upgrade scheme;
Step S3, for every two of the plurality of nodes to be upgraded having the master-slave connection relationship, determining a processing mode of a master node according to the upgrading manner of a slave node;
if the upgrading manner of the slave node is a first manner, then turn to Step S4;
if the upgrading manner of the slave node is a second manner, then turn to Step S5;
Step S4, the master node flashes and restores the differential upgrading file and sends the differential upgrading file to the slave node, so that the slave node completes upgrading; and
Step S5, the master node directly sends the differential upgrading file to the slave node for upgrading.

2. The OTA differential upgrade method of a master-slave architecture of claim 1, wherein the upgrade scheme comprises an upgrade sequence and connection conditions;
in Step S1, the root node determines the master-slave relationship between two of the plurality of nodes to be upgraded in this upgrading, according to the upgrade sequence;
in Step S4 or Step S5, for the two of the plurality of nodes to be upgraded having the master-slave connection relationship in this upgrading, the master node determines whether the slave node satisfies the corresponding connection relationship, and if the slave node satisfies the connection relationship, a connection is established between the master node and the slave node.

3. The OTA differential upgrade method of a master-slave architecture of claim 1, wherein current version data of the slave node is pre-stored in a slave storage area of the slave node;
in Step 4, for every two of the plurality of nodes to be upgraded having the master-slave connection relationship, Step S4 specifically comprises the steps of:
Step S40, obtaining, by the master node, the differential upgrading file and sending an upgrade request to the slave node;
Step S41, upon receiving an approval request from the slave node, controlling the master node and the slave node to enter an upgrading mode at the same time;
Step S42, the master node being connected to the slave node according to the master-slave connection relationship;
Step S43, obtaining, by the master node, current version data of the slave node, and storing the current version data to a main storage area of the master node;
Step S44, analyzing, by the master node, the differential upgrading file, to obtain differential block upgrade data corresponding to a plurality of main differential storage blocks in which the current version data in the main storage area is upgraded and changed;

Step S45, flashing and storing, by the master node, the current version data in all the plurality of main differential storage blocks according to the difference block upgrading data, to obtain flashed and restored upgrading version data; and Step S46, sending, by the maser node, all the differential block upgrade data to a respective slave differential storage block in which the current version data changes in the slave storage area, so that the slave node completes upgrading.

4. The OTA differential upgrade method of a master-slave architecture of claim 3, wherein Step S46 comprises:

Step S461, sending, by the master node, a flashing request to the slave node;

Step S462, upon receiving a receiving request corresponding to the flashing request from the slave node, sending all the differential block upgrade data to the slave differential storage block in the slave storage area, so that the slave node completes upgrading.

5. The OTA differential upgrade method of a master-slave architecture of claim 3, wherein Step S44 further comprises:

performing, by the master node, a backup storage of the current version data in the plurality of the main differential storage blocks, to generate a backup version data;

Step S46 is followed by Step S47;

Step S47, determining, by the master node, whether receiving version number of the slave node within a preset time:

if yes, exit the process;

if not, resend the differential block upgrade data to the slave node to determine whether the version number of the slave node is received within the preset time, and when the number of sending times exceeds a preset number of times, send the backup version data to the slave differential storage block of the slave node.

6. The OTA differential upgrade method of a master-slave architecture of claim 1, wherein the current version data of the slave node is pre-stored in the slave storage area of the slave node;

in step S5, for every two of the plurality of nodes to be upgraded having the master-slave connection relationship, Step S5 specifically comprises the steps of:

Step S50, obtaining, by the slave node, the differential upgrading file directly sent by the master node;

Step S51, the slave node being rebooted and entering the upgrading mode;

Step S52, obtaining, according to the differential upgrading file, the plurality of slave differential storage blocks in which the current version data changes in the slave storage area, and flashing the current version data in all the plurality of slave differential storage blocks.

7. The OTA differential upgrade method of a master-slave architecture of claim 6, wherein Step S52 further comprises:

performing a backup of the current version data in the slave differential storage blocks to generate backup version data;

Step S52 is followed by Step S53;

Step S53, after flashing all the slave differential storage blocks, it is determined whether the slave differential storage blocks can be rebooted again;

if yes, exit the process;

if not, flash the slave differential storage blocks according to the backup version data.

8. The OTA differential upgrade method of a master-slave architecture of claim 7, wherein a process of performing a backup of the current version data in the slave differential storage blocks comprises:

determining whether storage resources of the slave node meet a preset backup threshold:

if yes, store the backup version data in the slave storage area;

if not, store the backup version data in the main storage area of the master node.

9. The OTA differential upgrade method of a master-slave architecture of claim 3, wherein a verification step is executed before Step S43 or Step S52;

the verification step comprises:

determining whether a file verification value of the differential upgrading file is consistent with a data verification value of the current version data:

if yes, the verification is passed and continue to perform subsequent steps;

if not, the verification is not passed, and exit the process.

10. The OTA differential upgrade method of a master-slave architecture of claim 1, wherein in Step S1, when the root node analyzes if the node to be upgraded in this upgrading is only the root node;

in Step S2, the root node restarts and enters the upgrading mode, and obtains a plurality of root differential storage blocks where the current version data changes in a root storage area of the root node, and flashes the current version data in all the plurality of root differential storage blocks.

11. An OTA differential upgrade system of a master-slave architecture, comprising a server and a plurality of nodes to be upgraded, wherein the plurality of nodes to be upgraded comprise a root node; the nodes to be upgraded refer to a plurality of controllers and a plurality of processors arranged in one device, the root node is an LAN module or an IP network module;

the OTA differential upgrade system comprises:

an acquisition module for acquiring a preset upgrade scheme from the server, and determining a master-slave connection relationship between two of the plurality of nodes to be upgraded and an upgrading manner for each of the plurality of nodes to be upgraded according to the upgrade scheme;

a download module, connected to the acquisition module, and configured to download a differential upgrading file from the server according to the upgrade scheme;

a selection module, connected to the download module, and configured to determine a processing mode of a master node according to the upgrading manner of a slave node for every two of the plurality of nodes to be upgraded having the master-slave connection relationship;

a judging module, connected to the selection module, and configured to judge whether the upgrading manner of the slave node is the first manner or the second manner, and configured to generate a corresponding judgement result;

a first upgrade module, connected to the judging module and the download module, and configured to control the master node to flash and restore the differential upgrading file and to send the differential upgrading file to the slave node when the judgment result shows that the upgrading manner of the slave node is the first manner, so that the slave node completes upgrading;

a second upgrade module, connected to the judging module and the download module, and configured to control the master node to directly send the differential upgrading file to the slave node for upgrading when the judgment result shows that the upgrading manner of the slave node is the second manner.

12. The OTA differential upgrade system of a master-slave architecture of claim 11, wherein the upgrade scheme comprises an upgrade sequence and connection conditions;
the acquisition module for determining the master-slave relationship between two of the plurality of nodes to be upgraded in this upgrading, according to the upgrade sequence;
the first upgrade module or the second upgrade module, for the two of the plurality of nodes to be upgraded having the master-slave connection relationship in this upgrade, the master node determines whether the slave node satisfies the corresponding connection relationship, and if the slave node satisfies the connection relationship, a connection is established between the master node and the slave node.

13. The OTA differential upgrade system of a master-slave architecture of claim 11, wherein the current version data of the slave node is pre-stored in a slave storage area of the slave node;
the first upgrade module comprises:
a first acquisition module, for every two of the plurality of nodes to be upgraded having the master-slave connection relationship, the first acquisition module is configured to control the master node to acquire the differential upgrading file and send an upgrade request to the slave node;
a first restarting unit, connected to the first acquisition unit, and configured to control the master node to receive an approval request from the slave node, and to control the master node and the slave node to enter an upgrading mode at the same time according to the approval request;
a master-slave connection unit, connected to the first restarting unit, and configured to control the master node to connect to the slave node according to the master-slave connection relationship;
a second acquisition unit, connected to the master-slave connection unit, and configured to control the master node to obtain the current version data of the slave node and store the current version data in the main storage area of the master node;
an analyzing unit, connected to the second acquisition unit, and configured to control the master node to analyze the differential upgrading file to acquire differential block upgrade data corresponding to the plurality of main differential storage blocks in which the current version data in the main storage area is upgraded and changed;
a first flashing unit, connected to the analyzing unit, and configured to control the master node to flash and restore the current version data in all the plurality of main differential storage blocks according to the difference block upgrading data, to obtain flashed and restored upgrading version data;
a sending unit, connected to the first flashing unit, and configured to control the master node to send all the differential block upgrade data to a respective slave differential storage block in which the current version data changes in the slave storage area, so that the slave node completes upgrading.

14. The OTA differential upgrade system of a master-slave architecture of claim 11, wherein the current version data of the slave node is pre-stored in a slave storage area of the slave node;
the second upgrade module comprises:
a third acquisition unit for controlling the slave node to acquire the differential upgrading file sent directly by the master node;
a second restarting unit, connected to the third acquisition unit, and configured to control the slave node to restart and to enter an upgrading mode; and
a second flashing unit, connected to the second restarting unit, and configured to control the slave node, according to the differential upgrading file, to obtain a plurality of slave differential storage blocks in which the current version data changes in the slave storage area, and flash the current version data in all the slave differential storage blocks.

15. The OTA differential upgrade system of a master-slave architecture of claim 11, wherein the acquisition module comprises a judging unit for controlling the root node to analyze whether the node to be upgraded in this upgrading is the root node and generate a corresponding judgement result;
the download module comprises a fourth upgrade unit, wherein when the judgement result shows that the node to be upgraded in this upgrading is the root node, the fourth upgrade unit is configured to control the root node to restart and enter the upgrading mode, and obtain, according to the differential upgrading file, a plurality of root differential storage blocks in which the current version data changes in the root storage area of the root node, and flash the current version data in all the root differential storage blocks.

16. The OTA differential upgrade method of a master-slave architecture of claim 6, wherein a verification step is executed before Step S43 or Step S52;
the verification step comprises:
determining whether a file verification value of the differential upgrading file is consistent with a data verification value of the current version data:
if yes, the verification is passed and continue to perform subsequent steps;
if not, the verification is not passed, and exit the process.

* * * * *